(12) United States Patent
Zhang et al.

(10) Patent No.: US 10,303,940 B2
(45) Date of Patent: May 28, 2019

(54) PRISM-BASED EYE TRACKING

(71) Applicant: Google Inc., Mountain View, CA (US)

(72) Inventors: Zhibin Zhang, Mountain View, CA (US); Jerry Carollo, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 15/356,264

(22) Filed: Nov. 18, 2016

(65) Prior Publication Data

US 2017/0147859 A1 May 25, 2017

Related U.S. Application Data

(60) Provisional application No. 62/259,761, filed on Nov. 25, 2015.

(51) Int. Cl.
*G06T 7/70* (2017.01)
*G06K 9/00* (2006.01)
(Continued)

(52) U.S. Cl.
CPC ....... *G06K 9/0061* (2013.01); *G02B 27/0093* (2013.01); *G02B 27/0101* (2013.01);
(Continued)

(58) Field of Classification Search
CPC .......... G09B 9/12; G09B 9/165; G09B 9/307; G09B 9/302; G06F 3/011; G06F 3/016
See application file for complete search history.

(56) References Cited

U.S. PATENT DOCUMENTS 9,625,723 B2 † 4/2017 Lou
2001/0009478 A1 7/2001 Yamazaki et al.
(Continued)

FOREIGN PATENT DOCUMENTS

JP H08-50256 A 2/1996
WO 20150143073 9/2015

OTHER PUBLICATIONS

Third Party Submission Under CFR 1.290 submitted by Daniel Ho concerning U.S. Appl. No. 15/356,264, and received by the USPTO dated Oct. 31, 2017, and the notification thereof, 10 pages.
(Continued)

*Primary Examiner* — Jayanti K Patel
*Assistant Examiner* — Shadan E Haghani (57) ABSTRACT

An HMD device includes a display panel and an x-prism beamsplitter disposed along a first axis between the display panel and an expected position of an eye of a user. The x-prism beamsplitter directs a first light beam in a first direction from the display panel to the eye along the first axis, directs a second light beam in a second direction along a second axis substantially perpendicular to the first axis, and directs a third light beam in the second direction along the second axis, wherein the second light beam is representative of the first light beam and the third light beam is representative of a reflection of the first light beam off of the eye. The HMD device further includes an imaging camera to capture a composite image comprising a combination of both a representation of the second light beam and a representation of the third light beam.

17 Claims, 4 Drawing Sheets

(51) Int. Cl.

| | | |
|---|---|---|
| *G02B 27/00* | (2006.01) | |
| *G02B 27/01* | (2006.01) | |
| *G02B 27/14* | (2006.01) | |
| *G06F 3/01* | (2006.01) | |
| *H04N 5/225* | (2006.01) | |
| *H04N 5/235* | (2006.01) | |
| *H04N 5/265* | (2006.01) | |
| *H04N 5/33* | (2006.01) | |
| *G06F 1/16* | (2006.01) | |
| *G06F 3/03* | (2006.01) | |

(52) U.S. Cl.
CPC ....... *G02B 27/0172* (2013.01); *G02B 27/149* (2013.01); *G06F 1/163* (2013.01); *G06F 3/011* (2013.01); *G06F 3/013* (2013.01); *G06F 3/0304* (2013.01); *G06K 9/00604* (2013.01); *G06T 7/70* (2017.01); *H04N 5/2256* (2013.01); *H04N 5/2352* (2013.01); *H04N 5/265* (2013.01); *H04N 5/332* (2013.01); *G02B 27/141* (2013.01); *G02B 2027/0132* (2013.01); *G02B 2027/0138* (2013.01); *G06T 2207/10048* (2013.01); *G06T 2207/30201* (2013.01)

(56) References Cited

U.S. PATENT DOCUMENTS

| | | |
|---|---|---|
| 2005/0005185 A1 | 1/2005 | Yamamoto |
| 2008/0019684 A1* | 1/2008 | Shyu .................. G03B 17/245 396/332 |
| 2008/0232792 A1 | 9/2008 | Speggiorin et al. |
| 2011/0315863 A1* | 12/2011 | Yu ..................... H01L 31/02325 250/229 |
| 2013/0128364 A1 | 5/2013 | Wheeler et al. |
| 2014/0361957 A1† | 12/2014 | Hua |
| 2015/0022699 A1* | 1/2015 | Shimada ............... H04N 5/3696 348/273 |
| 2015/0049013 A1 | 2/2015 | Rahman et al. |
| 2015/0103151 A1* | 4/2015 | Carls .................... G02B 27/149 348/52 |
| 2016/0150219 A1* | 5/2016 | Gordon .............. H04N 13/0253 348/46 |
| 2017/0025031 A1* | 1/2017 | Dreyer ..................... G09B 9/12 |
| 2017/0139210 A1* | 5/2017 | Vallius ............... G02B 27/0172 |
| 2017/0148215 A1* | 5/2017 | Aksoy ................... G06T 19/006 |
| 2017/0242206 A1* | 8/2017 | Chen ........................ G02F 1/09 |
| 2017/0262703 A1* | 9/2017 | Wilson ............... G06K 9/00604 |
| 2018/0039327 A1* | 2/2018 | Noda ..................... G03B 13/06 |

OTHER PUBLICATIONS

International Search Report and Written Opinion correlating to PCT/US2016/062896 dated Feb. 10, 2017, 14 pages.

Rolland, J. and Cakmakci, O., "The Past, Present, and Future of Head Mounted Display Designs", Proc. of SPIE, vol. 5638, 2005, 10 pages.

International Preliminary Report on Patentability dated Nov. 16, 2017 for PCT Application No. PCT/US2016/062896, 19 pages.

Examination Report No. 1 for Australian Standard Patent Application No. 2016359149, 3 pages.

Japanese Office Action dated Nov. 20, 2018 for corresponding JP Application No. 2018-507532, 2 pages.

* cited by examiner
† cited by third party

PRISM-BASED EYE TRACKING

CROSS-REFERENCE TO RELATED APPLICATIONS

The present disclosure claims priority to co-pending U.S. Patent Application Ser. No. 62/259,761, entitled "Prism-Based Eye Tracking" and filed on Nov. 25, 2015, the entirety of which is incorporated by reference herein.

FIELD OF THE DISCLOSURE

The present disclosure relates generally to head mounted display systems and more particularly to eye tracking in head mounted display systems.

BACKGROUND

Head mounted display (HMD) devices utilize a display panel mounted in front of a user's eyes to display various types of content, including virtual reality (VR) content, augmented reality (AR) content, and the like. Eye tracking often is implemented in HMD systems to facilitate various functionalities, such as foveated imaging (also known as gaze-contingent imaging), eye-movement based user input or interaction, and the like. Conventional eye tracking mechanisms typically employ a complex arrangement of lenses and mirrors to capture an image of the eye, and from this image estimate a gaze direction of the eye. However, HMD device manufacturers strive to provide HMD devices with reduced form factors, and the complex optical mechanism required in conventional systems to provide this eye tracking function without occluding the display panel often inhibits implementation of a small form factor for the HMD device. Moreover, the algorithms implemented to estimate the eye gaze based on conventionally-captured eye images often are compute intensive and thus impracticable to implement in HMD devices absent a costly and power draining high-performance computing system.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving HMD-based eye-tracking systems. It is understood, however, that the present disclosure is not limited to these specific embodiments and details, which are examples only, and the scope of the disclosure is accordingly intended to be limited only by the following claims and equivalents thereof. To illustrate, the eye-tracking systems described herein may be utilized in other systems besides HMD-based systems. It is further understood that one possessing ordinary skill in the art, in light of known systems and methods, would appreciate the use of the disclosure for its intended purposes and benefits in any number of alternative embodiments, depending upon specific design and other needs.

FIGS. 1-5 illustrate example devices and techniques for eye tracking in an HMD device or other similar devices. In at least one embodiment, an x-prism beamsplitter is positioned along a view axis between a display panel and the expected location of a user's eye and an eye-tracking camera is positioned so as to focus on a port of the x-prism beamsplitter that is perpendicular to the two ports of the x-prism beamsplitter that intersect the view axis. For eye tracking purposes, a set of IR light sources having a fixed positional relationship with the display panel are triggered, or "flashed", so as to illuminate the user's eye through the x-prism beamsplitter. The x-prism beamsplitter causes an image or other representation of the light from the display screen and the IR light from the set of IR light sources to be projected to the eye-tracking camera while also concurrently causing an image or other representation of the reflection of the light from the user's eye and the area of surrounding the eye to be projected to the eye-tracking camera. The eye-tracking camera thus can capture a composite image that includes the imagery of the display panel and IR light sources and the imagery of the reflection from the user's eye and surrounding area. This composite image then may be analyzed to determine one or more of the current position, orientation, or gaze direction of the user's eye.

Figure 1:
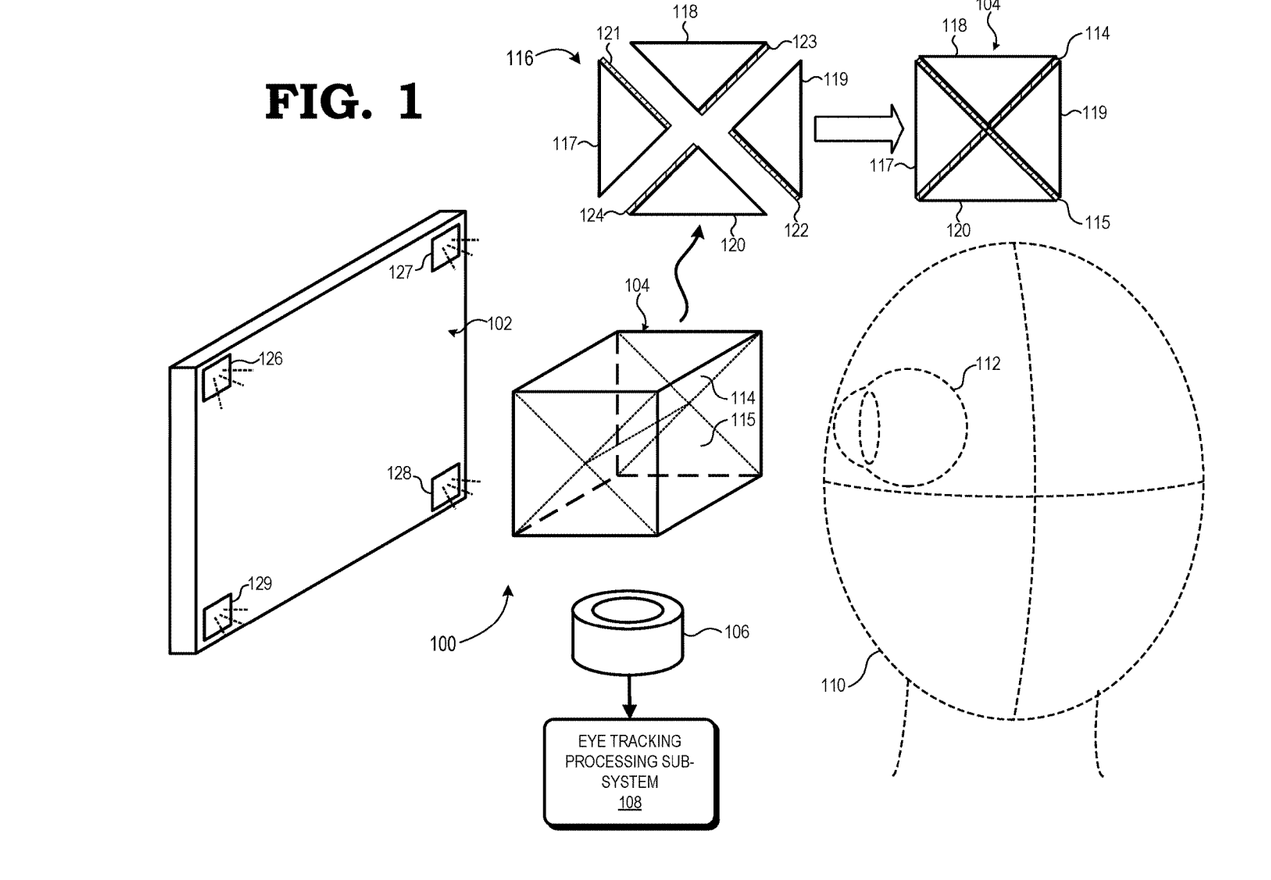
FIG. 1 is a diagram illustrating an arrangement of components of an eye-tracking system utilizing an x-prism beamsplitter in accordance with at least one embodiment of the present disclosure.

FIG. 1 illustrates an eye-tracking system 100 for implementation in a head mounted device (HMD) or similar display system in accordance with at least one embodiment. As depicted, the eye-tracking system 100 includes a display panel 102, an x-prism beamsplitter 104, an imaging camera 106, and an eye-tracking processing subsystem 108. The display panel 102 is used to display imagery to a user. In some embodiments, a single display panel 102 is used to jointly display separate side-by-side images, one for each eye 112 of the user. In other embodiments, a separate display panel 102 is used for each eye 112. Further, in some embodiments, both eyes of the user are tracked, in which case a separate eye-tracking camera 106 is implemented for each eye 112. A separate x-prism beamsplitter 104 likewise may be implemented for each eye, or a single x-prism beamsplitter 104 having a width (that is, in a direction parallel with the face of the display panel 102) that extends across both eyes 112 of the user may be used. One or more optical lenses (not shown) may be positioned along the view axis between the display panel 102 and the x-prism beamsplitter 104, between the x-prism beamsplitter 104 and the eye 112, or in both positions.

The x-prism beamsplitter 104 (hereinafter, "x-prism 104" for ease of reference) is positioned along a view axis (view axis 202, FIG. 2) between the display panel 102 and the expected or anticipated position of the eye 112. The x-prism 104 comprises a cube or other parallelepiped prism having two partially reflective surfaces 114, 115 that are substantially perpendicular (that is, 90°+/−10°) to each other and at substantially non-perpendicular angles relative to the view axis. As depicted in view 116, the x-prism 104 may be constructed through four separate right-angled triangular prisms 117, 118, 119, 120 that are adhered together or otherwise mechanically joined to form a parallelepiped beamsplitter. The prisms 117-120 are implemented such that for each partially reflective surface 114, 115, an incident light beam is partially transmitted and partially reflected. For example, the prisms 117-120 may be adhered together using a transparent (for the wavelengths of interest) adhesive layers having a thickness based on wavelengths of interest such that some proportion of the incident light beam (e.g., 50%) is reflected at a 90 degree angle relative to the angle of incidence and the remaining proportion of the incident light (e.g., 50%) is transmitted through the x-prism 104 substantially along its original path due to the frustrated total internal reflection phenomenon caused by the interface between the prisms and the thickness of the adhesive layer there between. Alternatively, facing sides of some of the prisms 117-120 may be coated with a thin or discontinuous coatings of metal (e.g., aluminum) or other suitable materials (e.g., IR/visible light dichroic materials) such that when the prisms 117-120 are joined together to form the x-prism 104, the thin/discontinuous coatings form the partially reflective surfaces 114, 115. For example, face 121 of prism 117 and face 122 of prism 119 each may receive a thin or discontinuous coating of the appropriate material such that when the prisms 117-120 are joined, the thin/discontinuous coatings on faces 121, 122 together form the partially reflective layer 115. Similarly, face 123 of prism 118 and face 124 of prism 120 each may receive a thin or discontinuous coating of material such that when the prisms 117-120 are joined, the thin/discontinuous coating on faces 123 and 124 together form the partially reflective surface 114.

In some embodiments, light outside of the visible spectrum, such as infrared (IR) light (and more particularly, near infrared (NIR) light), is used both to illuminate the eye 112 for purposes of eye tracking, as well as to serve as coordinate frame reference points for the eye tracking process. To illustrate, a set of one or more IR light sources, such as IR light sources 126, 127, 128, 129, may be implemented in a fixed positional relationship with the display panel 102 in a specified pattern. As described below, the specific pattern of the set of IR light sources and their fixed relationship relative to the display panel 102 serves as a coordinate frame reference. In some embodiments, this fixed positional relationship is obtained by affixing the IR light sources 126-129 in the display panel 102, such as at the four corners of the display panel 102 as depicted in FIG. 1, or along a border or "flex" of the display panel 102. In other embodiments, the IR light sources can be "virtually" embedded with relation to the display panel 102, such as by physically positioning the IR light sources near the camera space so that they are "virtually" positioned on the display panel 102 through one or more lenses. In either approach, as the IR light sources are fixed and the display panel 102 each are fixed, their relative position will not change and thus establishing a fixed relative positional relationship between the IR light sources and the display panel 102. The IR light sources 126-129 each may comprise for example, an IR-emitting vertical-cavity surface-emitting laser (VECSEL), an IR light emitting diode (LED), and the like.

Figure 2:
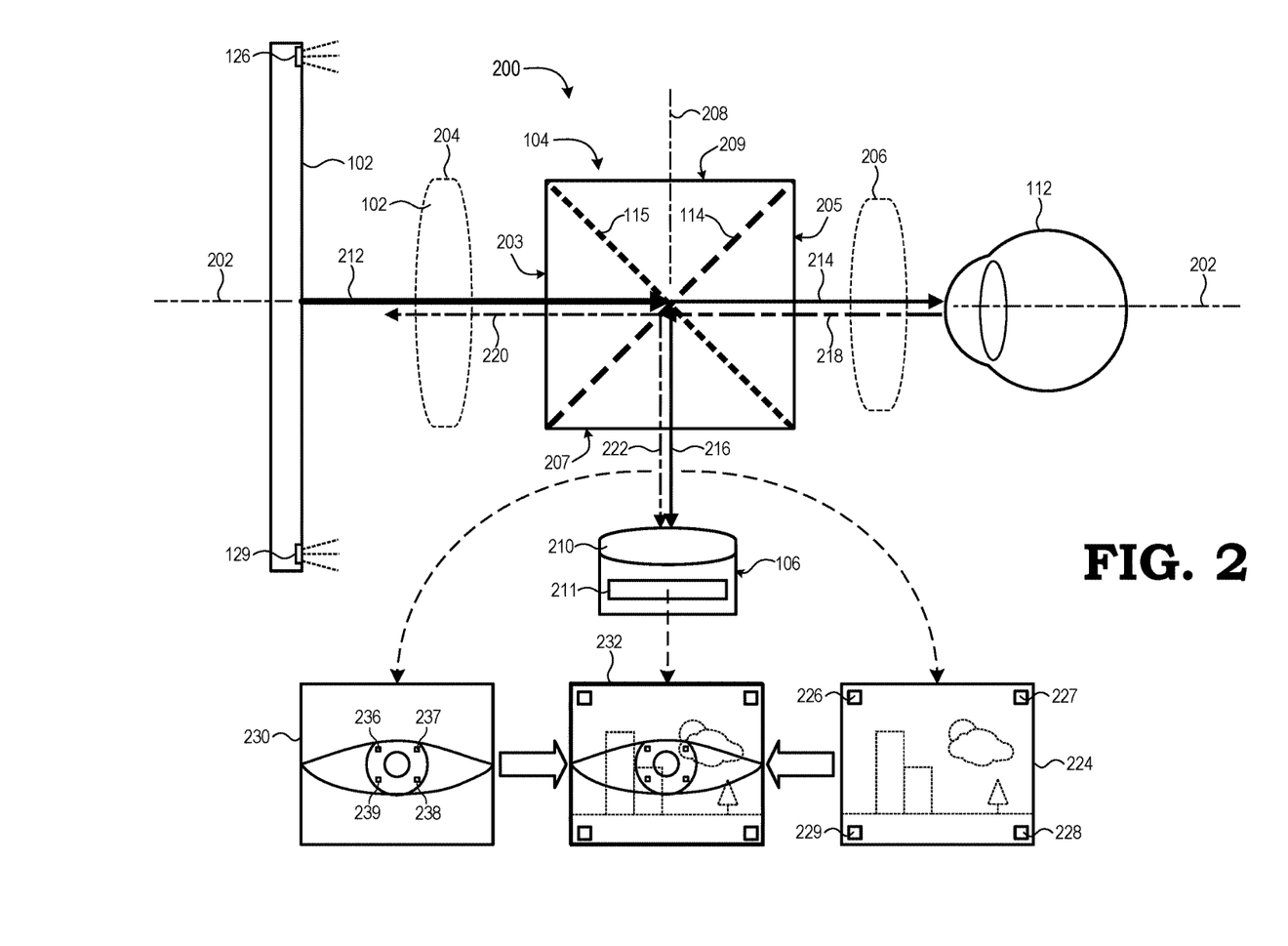
FIG. 2 is a diagram illustrating a cross-section view of the eye-tracking system of FIG. 1 in accordance with at least one embodiment of the present disclosure.

The general operation of the eye-tracking system 100 is better understood with reference to FIG. 2, which illustrates a cross-section view 200 of the eye-tracking system 100 in accordance with some embodiments. As depicted, the x-prism 104 is positioned between the display panel 102 and the expected position of the corresponding eye 112 of the user along, or aligned with, a view axis 202 between the display panel 102 and the eye 112, and thus having a port 203 facing the display panel 102 and an opposing port 205 facing the eye 112. One or more lenses or other optical elements may be disposed along this view axis 202, such as a magnifying lens 204 disposed between the display panel 102 and the x-prism 104 or a magnifying lens 206 disposed between the x-prism 104 and the eye 112.

The imaging camera 106 (hereinafter, "the eye-tracking camera 106") is disposed along an optical axis 208 (hereinafter, "the reflection axis 208") that generally is substantially perpendicular to the view axis 202 and intersecting the view axis 202 at or near the intersection of the partially reflective surfaces 114, 115 within the x-prism 104. That is, the eye-tracking camera 106 is focused on a port 207 that is perpendicular to the port 203. As shown in FIG. 2, the eye-tracking camera 106 includes a lens assembly 210 of one or more lenses to focus incident light onto an image sensor 211. As described herein, IR light may be utilized for eye illumination and reference point generation for purposes of eye tracking, and thus the image sensor 211 may comprise an image sensor that is sensitive to IR light or otherwise capable of capturing IR light content, such as an image sensor having dual red-green-blue (RGB) and IR capabilities. An example of such a sensor includes the OV4682 RGBIR imaging sensor available from OmniVision Technologies, Inc. Moreover, due to the relatively small form factor typically found in HMD devices, the eye-tracking camera 106 may be relatively close to the port 207 of the x-prism 104, and thus the eye-tracking camera 106 may be implemented with a small f number (or "f stop") so as to hyperfocus on the eye 112 and display panel 102 through the x-prism 104, with a modulation transfer function (MTF) that is suitable from infinite to the hyperfocus length.

In normal operation (that is, without engaging the eye tracking process described herein), the display panel 102 is driven by a display controller to display imagery in the form of visible light emitted from the display panel 102. This visible light is transmitted to the port 203 of the x-prism 104 along the view axis 202. As the visible light travels through the x-prism 104 from port 203 to opposing port 205 the visible light encounters the partially reflective surfaces 114, 115. In at least one embodiment, the partially reflective surface 114 is configured so as to be substantially transparent to light in the visible light spectrum (about 400 to 700 nanometers (nm), and thus the partially reflective surface 114 does not overly attenuate or occlude the visible light as it travels from port 203 to port 205 and thereon to the eye 112 along the view axis 202. In contrast, in at least one embodiment the partially reflective surface 115 is configured to be partially reflective to light in the visible light spectrum, and thus a portion of the visible light is reflected by the partially reflective surface 115 toward and through the port 207 along the reflection axis 208. As such, the x-prism 104 attenuates the intensity, or illumination, present in the visible light as it travels through the x-prism 104 to the eye 112. For example, assuming a 100% transmission ratio for the partially reflective surface 114 for visible light and a 50% reflection/50% transmission ratio for the partially reflective surface 115 (and assuming the losses within the x-prism 104 are negligible for ease of illustration), the luminosity of the visible light reaching the eye 112 through the x-prism 104 would be 50% of the luminosity of the visible light incident on the port 203. In a typical HMD application, the luminosity capacity of the display panel 102 is more than sufficient to compensate for this loss and deliver acceptable visible light intensity to the eye 112.

In an eye tracking operation, the set of light sources 126-129 (with only light sources 126 and 129 illustrated in the cross-section view 200) are activated and thus emit IR light which is combined with the visible light emitted by the display panel 102 to form a light beam 212 (hereinafter, "the initial light beam 212") that is focused on the port 203 of the x-prism 104. In traversing the x-prism 104 the initial light beam 212 encounters both the partially reflective surface 114 and the partially reflective surface 115. The partially reflective surface 115 allows a portion (e.g., 50%) of the IR and visible light of the initial light beam 212 to continue transmission along the view axis 202 to the port 207 and from there to the eye 212 as transmitted light beam 214, whereas another portion (e.g., 50%) of the IR and visible light from the initial light beam 212 is reflected at a right angle toward the port 207 along the reflection axis 208 as reflected light beam 216.

As noted above, the partially reflective surface 114 may be configured to be substantially transparent to visible light, and thus the reflective surface 114 does not significantly impact the transmission of the visible light content of the initial light beam 212. However, for light in the infrared spectrum (e.g., about 700 nm to 850 nm for NIR, or about 700 nm to 1000 nm for full-spectrum IR), the partially reflective surface 114 may be configured to be partially reflective, for example, with a 50% transmission/50% reflection ratio for IR light. Thus, when encountering the partially reflective surface 114, a portion (e.g., 50%) of the IR light present in the initial light beam 212 is transmitted to the port 205 and then on to the eye 112, while another portion (e.g., 50%) of the IR light is reflected along reflection axis 208 toward a port 209 opposite the port 207. Thus assuming, for example, a 50% reflection ratio for IR light by each of the partially reflective surfaces 114, and 0% and 50% reflection ratios for visible light by the partially reflective surface 114 and the partially reflective surface 115, respectively, the transmitted light beam 214 would contain 50% of the visible light and 25% of the IR light from the initial light beam 212 and the reflected light beam 216 would contain 50% of the visible light and 25% of the IR light from the initial light beam 212.

The transmitted light beam 214 leaves the x-prism 104 via the port 205 and impacts the eye 112. A portion of the IR and visible light present in the transmitted light beam 214 is reflected off the eye 112 and surrounding area back to the port 205 along view axis 202 as reflected light beam 218. As the reflected light beam 218 traverses the x-prism 104, the reflected light beam 218 encounters the partially reflective surfaces 114, 115, which, operate to transmit and reflect corresponding portion of the IR light and visible light present in the reflected light beam 218 in a manner similar to that described above with reference to the initial light beam 212. Thus, the partially reflective surfaces 114, 115 cause a portion of the reflected light beam 218 to be transmitted through to the port 203 along the view axis 203 as a transmitted light beam 220 and cause another portion of the reflected light beam 218 to be reflected toward the port 207 as reflected light beam 222. It will be appreciated that another portion of the reflected light beam 218 is reflected toward port 209, but this aspect is omitted from FIG. 2 for purposes of clarity.

Because of their partial reflectivity, the partially reflective surfaces 114, 115 operate to reflect a portion of the IR light present in the reflected light beam 218 toward the port 207 along reflection axis 208. To illustrate, assuming both of the partially reflective surfaces 114, 115 has a 50% reflection ratio for IR light, approximately 25% of the IR light present in the reflected light beam 218 is present in the reflected light beam 222 generated therefrom. Further, because the partially reflective surface 114 is substantially transparent to visible light, while the partially reflective surface 115 reflects at least a portion of incident visible light, the partially reflective surface 115 operates to reflect a portion of the visible light present in the reflected light beam 218 toward the port 209 along reflection axis 208. For example, assuming a 0% reflection ratio for the partially reflective surface 114 and a 50% reflection ratio for the partially reflective surface, or plane, for visible light, approximately 50% of the visible light present in the reflected light beam 218 is present in the reflected light beam 222 generated therefrom.

As the eye-tracking camera 106 is focused on the port 207, the reflected light beams 216, 222 emitted therefrom are concurrently captured by the imaging sensor 211. As the reflected light beam 216 is a beam-split representation of the initial light beam 212, the reflected light beam 216 represents an image 224 of the display panel 102 along with the IR light emitted by the set of IR light sources 126-129 as IR light points 226, 227, 228, 229, respectively. Similarly, the reflected light beam 222 is a beam-split representation of the reflected light beam 218, which in turn is a representation of a reflection of the display panel 102 and the set of IR light sources 126-129 off of the eye 112 and area surrounding the eye 112. Thus, the reflected light beam 222 represents an image 230 of the eye 112 and the surrounding area as illuminated by the IR light from the set of IR light sources 126-129 and the visible light emitted by the display panel 102. As such, the concurrent capture of the reflected light beams 216, 222 by the imaging sensor 21 results in the imaging sensor 211 capturing an image 232 that is a composite, or combination, of the images 224 and 230. Accordingly, the image 232 (hereinafter, "composite image 232") includes the visible light imagery displayed on the display panel 102 at the time of the image capture, the IR light emitted by the set of IR light sources 126-129 in the form of the IR light points 226-229, visible and IR light reflected from the eye 112 and surrounding area of the user, and reflections of some or all of the IR light point 226-229 off the eye 112 in the form of, for example, reflection points 236, 237, 238, and 239 for IR light points 226, 227, 228, and 229, respectively. From the position of one or more of the pupil, iris, cornea, or sclera of the eye 112 as detected from the composite image 232, the eye-tracking processing subsystem 108 can determine the gaze angle or gaze direction of the eye 112 using any of a variety of eye tracking algorithms. Further, the presence of the IR light points 226, 227, 228, and 229 may help to further pinpoint the gaze direction of the eye 112 by acting as a coordinate reference frame that is tied to the corners of the display panel 102, as described in greater detail herein.

Figure 3:
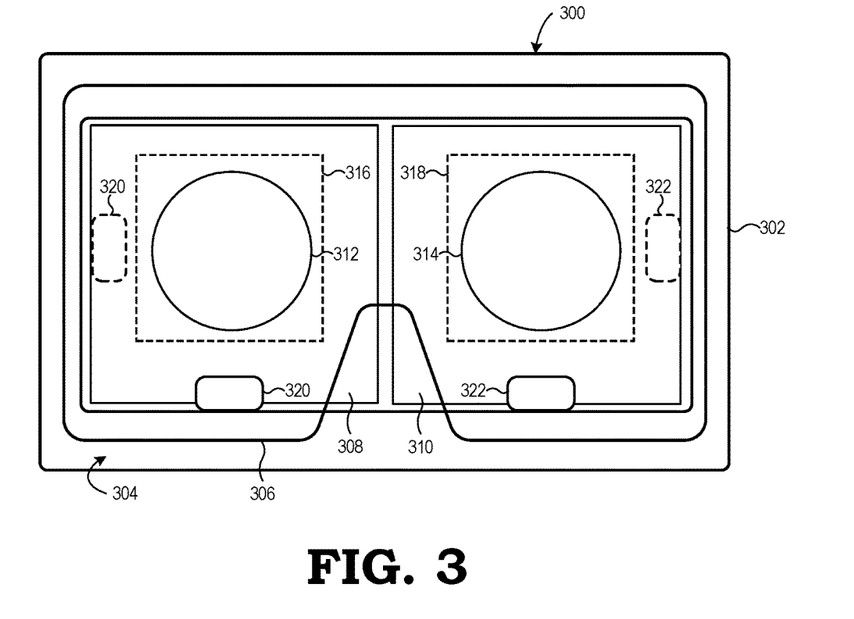
FIG. 3 is a diagram illustrating a rear view of an HMD device implementing the eye-tracking system of FIG. 1 in accordance with at least one embodiment of the present disclosure.

FIG. 3 illustrates an example HMD device 300 configured to implement the eye-tracking system 100 of FIGS. 1 and 2 in accordance with at least one embodiment. The HMD device 300 is mounted to the head 110 of the user through the use of an apparatus strapped to, or otherwise mounted on, the user's head 110 such that the HMD device 300 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head 110 moves. In such instances, a hand-held device operated in this manner also may be considered an implementation of the HMD device 300 even though it is not "mounted" via a physical attachment to the user's head 110.

The HMD device 300 comprises a housing 302 having a surface 304, and a face gasket 306 and set of straps or a harness (omitted from FIG. 3 for clarity) to mount the housing 302 on the user's head 110 so that the user faces the surface 304 of the housing 302. In the depicted embodiment, the HMD device 300 is a binocular HMD and thus has a left-eye display 308 and a right-eye display 310 disposed at the surface 304 (with displays 308, 310 collectively or separately representing an embodiment of the display panel 102). The displays 308, 310 may be implemented as separate display panels (that is independent display arrays driven by separate display driver hardware components) or the displays 308, 3100 may be implemented as logically-separated regions of a single display panel (e.g., a single display array logically divided into left and right "halves"). The housing 302 further includes an eyepiece lens 312 aligned with the left-eye display 308 and an eyepiece lens 314 aligned with the right-eye display 310. Alternatively, in some embodiments, the HMD device 300 may be implemented as a monocular HMD in that a single image is presented to both eyes of the user, either through left and right eyepiece lenses 312, 314, or directly without an intervening lens.

In the depicted example, the HMD device 300 further includes a separate implementation of the eye-tracking system 100 for each eye, and thus includes an x-prism 316 disposed between the lens 312 and the display 308 for the left eye and an x-prism 318 disposed between the lens 314 and the display 310 for the right eye (with the x-prisms 316, 318 comprising embodiments of the x-prism 104). Further, the HMD device 300 includes eye-tracking camera 320 disposed below the x-prism 316, or alternatively to the side or above the x-prism 316, and an eye-tracking camera 322 disposed below, above, or to the side of the x-prism 318 (where the eye-tracking cameras 320, 322 are embodiments of the eye-tracking camera 106). The eye-tracking camera 320 operates to capture composite images of the left eye of the user and the display 308 via capture of concurrently reflected light beams by the x-prism 316 using the techniques described herein. Likewise, the eye-tracking camera 322 operates to capture composite images of the right eye of the user and the display 310 using the x-prism 318 in a similar manner.

Figure 4:
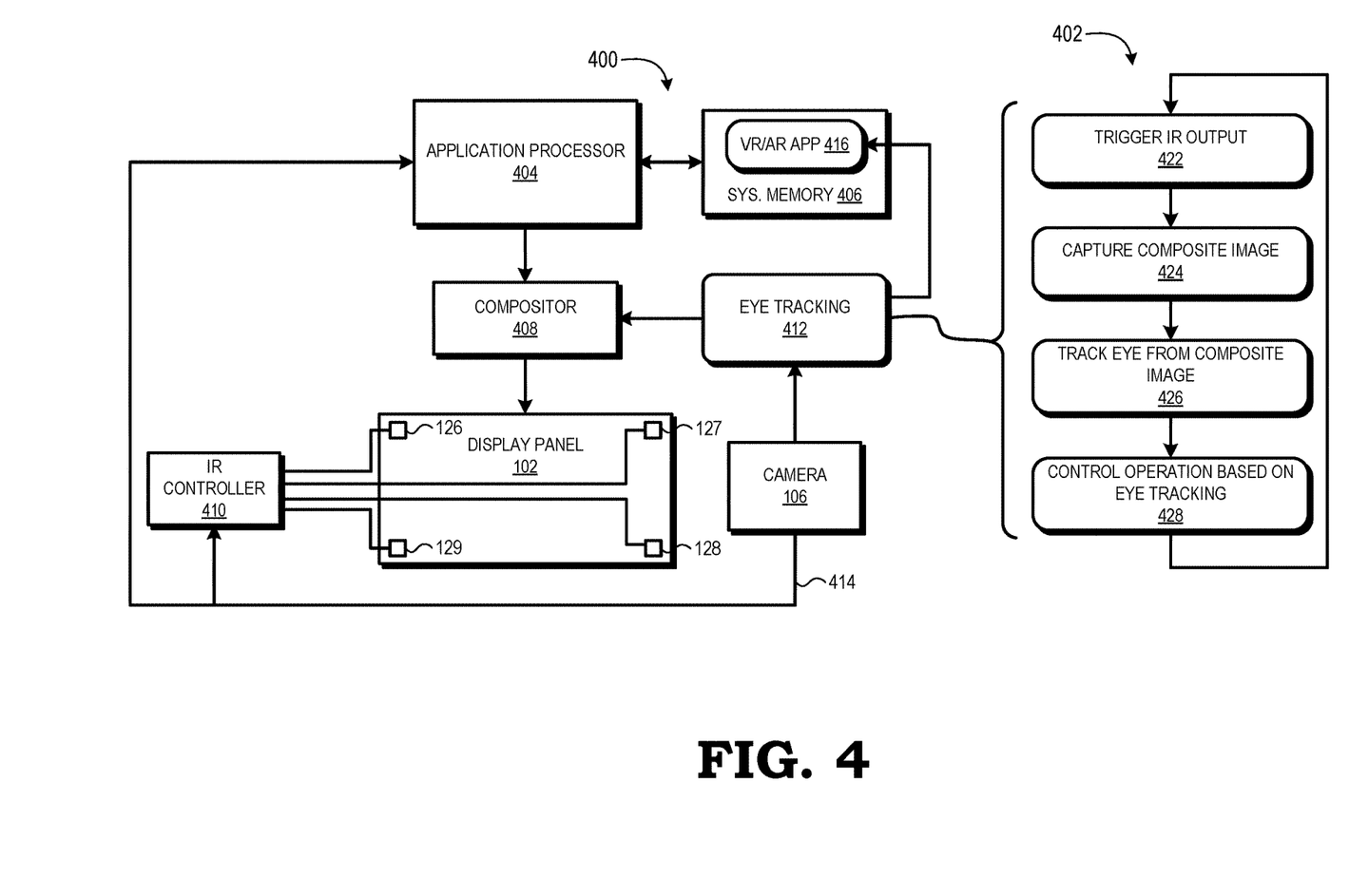
FIG. 4 is a diagram illustrating a processing system of the HMD device of FIG. 3 in accordance with at least one embodiment of the present disclosure.

FIG. 4 illustrates an example hardware configuration 400 of the HMD device 300 of FIG. 3, as well as a method 402 of operation of the hardware configuration 400 for implementation of an eye tracking process in accordance with some embodiments. The hardware configuration 400 includes an application processor 404, a system memory 406, a compositor 408, an IR controller 410, the display panel 102, and the eye-tracking camera 106. The hardware configuration 400 further includes an eye-tracking module 412 (one embodiment of the eye-tracking processing subsystem 108 of FIG. 1) coupled to the eye-tracking camera 106. For ease of illustration, the hardware configuration 400 is illustrated in a configuration for tracking a single eye. However, for dual eye tracking implementations, the hardware configuration 400 would further include a second eye-tracking camera 106 for the second eye, and depending on the particular display configuration, a second display panel 102, a second set of IR light sources 126-129, and a second IR controller 410, which would operate in the same manner as that described below.

The eye-tracking module 412 may be implemented through software—that is, the application processor 404 or other processor executing a set of executable instructions (that is, "software") stored in the system memory 406 or other storage location. Alternatively, the eye-tracking module 412 may be implemented as hard-coded logic, such as via an application specific integrated circuit (ASIC), programmable logic, and the like. Further, in some embodiments, the eye-tracking module 412 may be implemented through a combination of software and hard-coded logic. The application processor 404 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the application processor 404. The compositor 408 may be implemented as, for example, an ASIC, programmable logic, as one or more GPUs executing software that manipulates the one or more GPUs to provide the described functionality, or a combination thereof. The IR controller 410 is coupled to the set of IR light sources 126-129 of the display panel 102 and is coupled to the eye-tracking camera 106 via a signal line 414.

In operation, the application processor 404 executes a VR/AR application 416 (stored in, for example, the system memory 406) to provide VR/AR functionality for a user. As part of this process, the VR/AR application 416 manipulates the application processor 404 or associated processor to render a sequence of images for display at the display panel 102, with the sequence of images representing a VR or AR scene. The compositor 408 operates to drive the display panel 102 to display the sequence of images, or a representation thereof.

In parallel, the eye-tracking camera 106, the IR controller 410, and the eye-tracking module 412 operate together to track the movement, position, and/or gaze direction of the corresponding eye 112. Method 402 illustrates an example of this process. In at least one embodiment the gaze direction, position, or orientation of the eye 112 is updated at a specified frequency or rate, which may be based on the frame rate of the imagery being displayed at the display panel 102 or based on another factor. Accordingly, to initiate an update iteration, at block 422 the eye-tracking camera 106 signals the IR controller 410 via an assertion or other manipulation of the signal line 414, and in response the IR controller 410 triggers the set of IR light sources 126-129 to briefly output IR light (that is, to "flash") so as to illuminate the eye 112 and surrounding area. To illustrate, in one embodiment the eye-tracking camera 106 may implement a global shutter that is triggered via a corresponding vertical sync (VSYNC) signal (which may be controlled by, or otherwise coordinated with the application processor 404, along with the vertical sync signal for the display panel 102), and thus each time the VSYNC signal is asserted to trigger the global shutter, the signal line 414 likewise is asserted so as to trigger the IR light flash by the IR controller 410. In this manner, the IR light flashes can be synchronized to the global shutter of the eye-tracking camera 106.

As described above, the light emitted by the display panel 102 and the IR light from the set of IR light sources 126-129 traverses through the x-prism 104, reflects off the eye 112 and area surrounding the eye, and results in both a representation of the display panel 102 and the set of IR light sources 126-129 and a representation of the eye 112 and surrounding area being projected by the x-prism 104 to the eye-tracking camera 106 concurrently. Accordingly, at block 424 the eye-tracking camera 106 captures a composite image (e.g., composite image 232, FIG. 2) of both representations and provides the composite image to the eye-tracking module 412 for processing. At block 426, the eye-tracking module 412 performs an image analysis process on the composite image to identify one or more of the current position or orientation of the iris/pupil of the eye 112, and from this information the eye-tracking module 412 may determine the current gaze direction of the eye 112. Examples of this process are described below with reference to FIG. 5.

With one or more of the current position of the iris/pupil, the current orientation of the iris/pupil, or the gaze direction of the eye 112 identified, at block 428 the eye-tracking module 412 may modify the operation of one or more components of the hardware configuration 400 accordingly. To illustrate, in some embodiments the current gaze direction may be used to provide a foveated display, and thus in such instances, the eye-tracking module 412 may signal the current gaze direction to the VR/AR application 416 or the compositor 408 so as control the rendering of the displayed imagery to provide improved resolution in the area of current focus of the eye 112. As another example, in some embodiments the VR/AR application 416 or another software application may utilize the user's gaze direction as a user input. For example, the HMD device 300 may provide eye-based human computer interaction, and thus the eye-tracking module 412 may provide the current gaze direction to this application as user interface input; that is, as a virtual mouse or for other eye "gesture" inputs). Other uses for this eye tracking information includes, for example, using the eye tracking information to activate/deactivate the HMD device 300, for biometric information (e.g., for authenticating the user via the eye movements or otherwise identifying the user via eye tracking), and the like.

Figure 5:
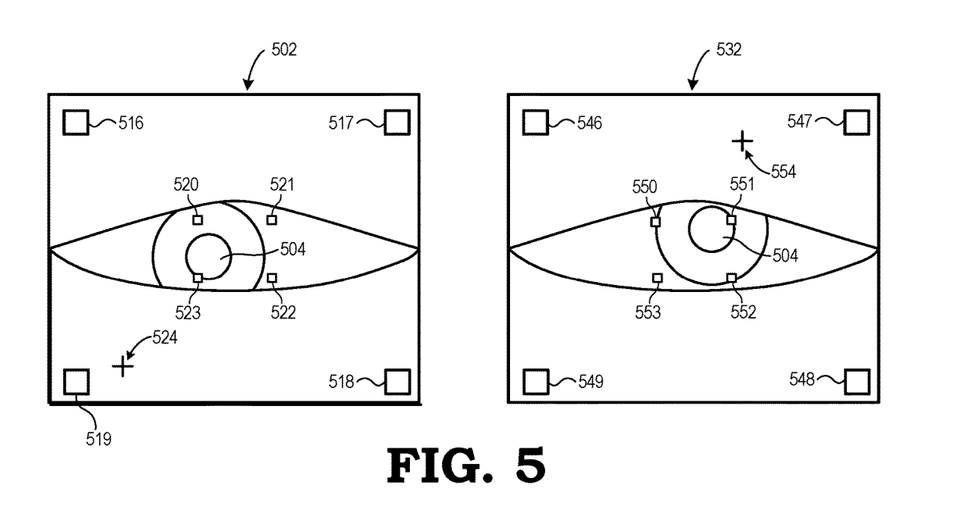
FIG. 5 is a diagram illustrating two examples of composite images for use in eye tracking in accordance with at least one embodiment of the present disclosure.

FIG. 5 illustrates two examples of processing of a composite image to determine a current eye gaze direction in accordance with at least one embodiment of the present disclosure. In the first example, a composite image 502 of both the display panel 102 and the current position of the eye 112 is captured in accordance with the processes described above. The eye-tracking module 412 identifies the current position of the pupil 504 and, based on the orientation of the pupil 504 relative to a coordinate reference frame provided by the pattern of IR light points 516, 517, 518, 519 from the set of IR light sources 126-129 and provided by the pattern of IR light points 520, 521, 522, 523 from the reflection of the IR light sources 126-129 off of the eye 112, the eye-tracking module 412 may determine that the current eye gaze is directed to a point 524 in a lower left quadrant of the display panel 102.

In the second example, a composite image 532 of both the display panel 102 and the current position of the eye 112 is captured in accordance with the processes described above. The eye-tracking module 412 identifies the current position of the pupil 504 and, based on the orientation of the pupil 504 relative to a coordinate reference frame provided by the pattern of IR light points 546, 547, 548, 549 from the set of IR light sources 126-129 and provided by the pattern of IR light points 550, 551, 552, 553 from the reflection of the IR light sources 126-129 off of the eye 112, the eye-tracking module 412 may determine that the current eye gaze is directed to a point 554 in an upper right quadrant of the display panel 102.

Any of a variety of eye tracking algorithms may be used to track the current gaze direction of the eye 112 from the composite image 532, with appropriate modification in view of the coordinate reference frame provided by the light sources in the composite image. To illustrate, in a single eye-tracking camera implementation, the IR light sources may act as point sources, and based on their relative intensity, the distance to the eye 112 may be determined. Further, based on triangulation (using the distance) from the many point sources represented by the IR light sources, a 3D model of the eye 112 may be constructed, and from this 3D model the optical axis, and thus gaze direction, may be determined. In a dual eye tracking implementation, the 3D model of the eye 112 may be constructed via the parallax phenomenon provided through the use of two cameras. Further, this approach is not generally sensitive to ambient light, and thus visible light sources may be used to illuminate the eye 112 in place of the IR light sources described above.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. An "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A head mounted display (HMD) device comprising:
a display panel to display imagery;
a set of one or more infrared (IR) light sources disposed at fixed positions in relation to the display panel;
an x-prism beamsplitter disposed along a first axis between the display panel and an expected position of an eye of a user, the x-prism beamsplitter comprising a first partially reflective surface disposed at a first angle relative to the first axis and a second partially reflective surface disposed at a second angle relative to the first axis, the second angle substantially perpendicular to the first angle, to direct a first light beam including IR light emitted by the set of one or more IR light sources in a first direction from the display panel to the eye along the first axis, the first partially reflective surface to direct a second light beam in a second direction along a second axis substantially perpendicular to the first axis, and the second partially reflective surface to direct a third light beam in the second direction along the second axis, wherein the first partially reflective surface partially reflects both visible light and IR light, and the second partially reflective surface partially reflects IR light and is substantially transparent to visible light and wherein the second light beam is representative of the first light beam and the third light beam is representative of a reflection of the first light beam off of the eye; and
an imaging camera having an optical axis aligned with the second axis, the imaging camera to capture a composite image comprising a combination of both a representation of the second light beam and a representation of the third light beam.

2. The HMD device of claim 1, wherein:
the imaging camera comprises an IR camera with a global shutter; and
wherein the set of one or more IR light sources are triggered based on a vertical sync signal of the global shutter.

3. The HMD device of claim 1, further comprising:
an eye tracking module to determine at least one of a position of the eye, an orientation of the eye, or a gaze direction of the eye based on the composite image.

4. The HMD device of claim 3, wherein:
the eye tracking module is to determine the at least one of the position of the eye, the orientation of the eye, or the gaze direction of the eye based on use of the IR light from the set of one or more IR light sources present in the composite image as a reference coordinate frame.

5. The HMD device of claim 3, wherein:
at least one component of the HMD device is controlled based on the position of the eye, the orientation of the eye, or the gaze direction of the eye.

6. The HMD device of claim 1, wherein:
the set of one or more IR light sources comprises a set of one or more vertical-cavity surface-emitting lasers.

7. In a head mounted display (HMD) device, a method comprising:
transmitting a first light beam including infrared (IR) light along a first axis from a display panel to an eye of a user through a first partially reflective surface and a second partially reflective surface of an x-prism beamsplitter, wherein
the first partially reflective surface is disposed at a first angle relative to the first axis;
the second partially reflective surface is disposed at a second angle relative to the first axis, the second angle substantially perpendicular to the first angle; and
the first partially reflective surface partially reflects both visible light and IR light, and the second partially reflective surface partially reflects IR light and is substantially transparent to visible light;
transmitting a second light beam from the first partially reflective surface of the x-prism beamsplitter to an imaging camera along a second axis substantially perpendicular to the first axis, the second light beam representing a reflection of the first light beam;
transmitting a third light beam from the second partially reflective surface of the x-prism beamsplitter to the imaging camera along the second axis, the third light beam representing a reflection of the first light beam off of the eye of the user; and
capturing, at the imaging camera, a composite image representing a combination of both a representation of the second light beam and a representation of the third light beam.

8. The method of claim 7, wherein:
the first light beam includes IR light emitted by a set of one or more IR light sources disposed at corresponding positions in association with the display panel.

9. The method of claim 8, further comprising:
triggering the set of one or more IR light sources based on a vertical sync signal of a global shutter of the imaging camera.

10. The method of claim 8, further comprising:
determining, at a processing module of the HIVID device, at least one of a position of the eye, an orientation of the eye, or a gaze direction of the eye based on the composite image.

11. The method of claim 10, wherein:
determining the at least one of the position of the eye, the orientation of the eye, or the gaze direction of the eye comprises using the IR light from the set of one or more IR light sources present in the composite image as a reference coordinate frame.

12. The method of claim 10, further comprising:
controlling an operation of at least one component of the HMD device based on the position of the eye, the orientation of the eye, or the gaze direction of the eye.

13. The method of claim 8, wherein:
the set of one or more IR light sources comprises a set of one or more vertical-cavity surface-emitting lasers.

14. In a head mounted display (HMD) device, a method comprising:
receiving, at a processing module of the HMD device, a composite image from an imaging camera of the HIVID device, the composite image representing both a first light beam including infrared (IR) light transmitted along a first axis and a second light beam concurrently received from a port of an x-prism beamsplitter, the first light beam representing a reflection from a first partially reflective surface of the x-prism beamsplitter of a light beam emitted by a display panel of the HMD device and the second light beam representing a reflection from a second partially reflective surface of the x-prism beamsplitter of the light beam emitted by the display panel off of an eye of a user, wherein:
the first partially reflective surface is disposed at a first angle relative to the first axis;
the second partially reflective surface is disposed at a second angle relative to the first axis, the second angle substantially perpendicular to the first angle; and
the first partially reflective surface partially reflects both visible light and IR light, and the second partially reflective surface partially reflects IR light and is substantially transparent to visible light; and
determining, at the processing module, at least one of a position of the eye, an orientation of the eye, or a gaze direction of the eye based on the composite image.

15. The method of claim 14, further comprising:
controlling an operation of at least one component of the HMD device based on the position of the eye, the orientation of the eye, or the gaze direction of the eye.

16. The method of claim 14, wherein:
the light beam emitted by the display panel includes infrared (IR) light emitted by a set of one or more IR light sources disposed at corresponding positions on the display panel.

17. The method of claim 16, wherein:
determining the at least one of the position of the eye, the orientation of the eye, or the gaze direction of the eye comprises using the IR light from the set of one or more IR light sources present in the composite image as a reference coordinate frame.

* * * * *

UNITED STATES PATENT AND TRADEMARK OFFICE
CERTIFICATE OF CORRECTION

PATENT NO. : 10,303,940 B2
APPLICATION NO. : 15/356264
DATED : May 28, 2019
INVENTOR(S) : Zhibin Zhang and Jerry Carollo Page 1 of 1

It is certified that error appears in the above-identified patent and that said Letters Patent is hereby corrected as shown below:

In the Claims

At Column 13 Line 2, Claim 10 correct "module of the HIVID device" to be --module of the HMD device--

At Column 13 Line 24, Claim 14 correct "HIVID device" to be --HMD device--

Signed and Sealed this
Twelfth Day of November, 2019

Andrei Iancu
*Director of the United States Patent and Trademark Office*